United States Patent Office 2,881,216
Patented Apr. 7, 1959

2,881,216

1 (p AMINOPHENYL) 1 PHENYL ALKANOLS AND ALKANONES

John B. Wright, Kalamazoo Township, Kalamazoo County, Mich., assignor to The Upjohn Company, Kalamazoo, Mich., a corporation of Michigan No Drawing. Application April 25, 1958
Serial No. 730,822

19 Claims. (Cl. 260—570)

This invention relates to certain novel organic compounds, more particularly to 1-(p-aminophenyl)-1-aryl-2-hydrocarbonoxyalkanols and 1-(p-aminophenyl)-1-aryl-2-alkanones and acid and addition salts thereof.

The novel compounds of this invention are prepared by reacting a p-tertiaryaminophenyl lithium with an aryl alpha-hydrocarbonoxyalkyl ketone to produce a 1-(p-aminophenyl)-1-aryl-2 hydrocarbonoxyalkanol which is then reacted with aqueous acid to produce a 1-(p-aminophenyl)-1-aryl-2-alkanone. These compounds and reactions may be represented by the following formulae:

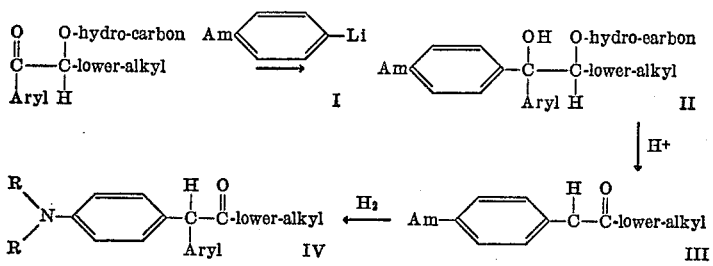

wherein R is a hydrogen or lower-alkyl and Am is tertiary di-lower-alkylamino, tertiary lower-alkylbenzylamino, tertiary dibenzylamino or an alkyleneamino group of the formula

R′N— wherein R′ is an alkylene radical containing from four to eight carbon atoms, inclusive, which with the amino nitrogen atom forms a ring containing from four to five carbon atoms. Lower-alkyl in every instance means containing from one to eight carbon atoms, inclusive. Hydrocarbon is limited to those hydrocarbon radicals containing from one to eight carbon atoms, inclusive, e.g., phenyl, tolyl, xylyl, methyl, ethyl, allyl, octyl, etc. Aryl in every instance means hydrocarbon carbocyclic aryl containing from six to twelve carbon atoms, inclusive, e.g., phenyl, tolyl, xylyl, diethylphenyl, propylphenyl, dipropylphenyl. The alkanones of this invention (III, IV) are converted to their acid addition salts by reaction with anhydrous or aqueous acid. The alkanones (III) where Am is dibenzyl or lower-alkyl-benzyl are reduced with hydrogen and palladium catalyst thereby removing the benzyl groups to the corresponding primary and secondary alkanones (IV).

It is an object of this invention to provide 1-(p-aminophenyl)-1-aryl-2-hydrocarbonoxyalkanols (II) and 1-(p-aminophenyl)-1-aryl-2-alkanones (III, IV) and acid addition salts thereof. Another object is the provision of processes for the production thereof. Other objects will be apparent to those skilled in the art to which this invention pertains.

The 1-(p-aminophenyl)-1-aryl-2-alkanones (III, IV) and acid addition salts thereof of the present invention are sleep potentiators when given with hexabarbital, thereby increasing the effectiveness of the hexabarbital or reducing the amount of hexabarbital required to achieve a desired response. They also are anticonvulsants. The 1-(p-aminophenyl)-1-aryl-2-hydrocarbonoxyalkanols (II) are useful as intermediates in the preparation of the 1-(p-aminophenyl)-1-aryl-2-alkanones (III, IV).

The novel hydrocarbonoxyalkanols (II) of this invention are prepared by reacting a p-tertiaryaminophenyl lithium with an aryl α-hydrocarbonoxyalkyl ketone in a non-reactive solvent, usually ether, tetrahydrofuran or a hydrocarbon solvent. The mixture is ordinarily refluxed and then decomposed with aqueous ammonium chloride. The p-disubstituted-aminophenyl lithium compounds are prepared by reacting a p-bromo-N-disubstituted aniline with lithium in the usual manner. The aryl α-hydrocarbonoxyalkyl ketone is then added to the reaction mixture.

1-(p-aminophenyl)-1-aryl-2-hydrocarbonoxyalkanols (II) thus prepared include 1-(p-dimethylaminophenyl)-1-phenyl-2-ethoxypropanol, 1-(p-dimethylaminophenyl)-1-p-tolyl-2-ethoxypropanol, 1-(p-dimethylaminophenyl)-1-sym.-xylyl-2-ethoxybutanol, 1 - (p-dimethylaminophenyl)-1-phenyl-2 - methoxyoctanol, 1-(p-diethylaminophenyl)-1-phenyl-2 - ethoxypropanol, 1-(p-diethylaminophenyl) - 1 - phenyl - 2 - octyloxypropanol, 1-(p-diethylaminophenyl)-1-phenyl-2-ethoxybutanol, 1-(p-diethylaminophenyl)-1-phenyl-2-methoxyoctanol, 1-(p-methylbenzylaminophenyl) - 1 - phenyl-2-ethoxypropanol, 1-(p-methylbenzyl-aminophenyl)-1-phenyl-2-methoxybutanol, 1-(p-methylbenzyl-aminophenyl)-1-phenyl-2-ethoxyoctanol, 1-(p-dibenzylamino-phenyl)-1-phenyl-2 - methoxypropanol, 1-(p-dibenzylamino-phenyl)-1-phenyl-2 - ethoxypropanol, 1-(p-dibenzylaminophenyl) - 1-phenyl - 2 - methoxybutanol, 1-(p-dibenzylaminophenyl) - 1-phenyl-2-ethoxyoctanol, and the corresponding 2-aryl, preferably phenyl, ethers, e.g., 1-(p-dimethylaminophenyl)-1-phenyl-2-phenoxypropanol, 1-(p-dimethylaminophenyl) - 1 - phenyl-2-phenoxyhexanol, 1 - (p-diethylaminophenyl)-1-phenyl-2-phenoxypropanol, 1-(p-dimethylaminophenyl) - 1-phenyl-p-tolyloxypropanol, 1-(p-dibenzylaminophenyl) - 1-phenyl - 2 - phenoxypropanol, 1 - (p-dibenzylaminophenyl)-1-phenyl-2-phenoxyoctanol and 1-(p-pyrrolidinophenyl)-1-phenyl-2-phenoxypropanol.

The novel alkanones of this invention (III, IV) comprise those wherein the amino group is substituted with lower-alkyl, lower-alkylbenzyl, dibenzyl, lower-alkyl or is unsubstituted. The unsubstituted (IV, R=H) are prepared by hydrogenating the corresponding dibenzyl amines (III, Am=dibenzylamino) with hydrogen in the presence of a palladium catalyst. The monoalkyl compounds of this invention are similarly prepared from the alkylbenzylamines (III, Am=alkylbenzylamino) by hydrogenation to produce the monoalkylamine (IV, R=H, alkyl). Preferred are the di-lower-alkylamines, preferably dimethylamines. Also preferred are those compounds where lower-alkyl is methyl or ethyl.

The 1-(p-aminophenyl)-1-aryl-2-alkanones (III) are prepared by treatment of a 1-(p-aminophenyl)-1-aryl-2-hydrocarbonoxyalkanol (II) with strong acid, e.g., ten percent to concentrated hydrochloric, preferably by heating up to 100 degrees centigrade. Several hours of heating are usually employed to insure complete reaction.

The acid addition salts of the alkanones (III, IV) of this invention, e.g., the non-toxic acid addition salts, include the hydrochloride, hydrobromide, hydriodide, sulfate, phosphate, nitrate, acetate, formate, citrate, tartrate, and lactate. They are conveniently prepared by adding the acid in equivalent or excess amount to a solution of the base under anhydrous conditions. Alternatively, an aqueous solution of the salt can be prepared and the water removed in vacuo. 1-(p-aminophenyl)-1-aryl-2-alkanones (III, IV) thus prepared include 1-(p-aminophenyl)-1-phenyl-2-propanone, 1-(p-aminophenyl)-1-phenyl-2-butanone, 1-(p-aminophenyl)-1-phenyl-2-octanone, 1-(p-methylaminophenyl)-1-phenyl-2-propanone, 1-(p-methylaminophenyl)-1-phenyl-2-butanone, 1-(p-methylaminophenyl)-1-phenyl-2-octanone, 1-(p-ethylaminophenyl)-1-phenyl-2-propanone, 1-(p-ethylaminophenyl)-1-phenyl-2-butanone, 1-(p-ethylaminophenyl)-1-p-tolyl-2-butanone, 1-(p-ethylaminophenyl)-1-sym.-xylyl-2-octanone, 1-(p-dimethylaminophenyl)-1-phenyl-2-propanone, 1-(p-dimethylaminophenyl)-1-phenyl-2-butanone, 1-(p-dimethylaminophenyl)-1-p-tolyl-2-butanone, 1-(p-dimethylaminophenyl)-1-phenyl-2-octanone, 1-(p-diethylaminophenyl)-1-phenyl-2-propanone, 1-(p-diethylaminophenyl)-1-phenyl-2-butanone, 1-(p-diethylaminophenyl)-1-p-tolyl-2-butanone, 1-(p-diethylaminophenyl)-1-phenyl-2-octanone, 1-(p-methylbenzylaminophenyl)-1-phenyl-2-propanone, 1-(p-methylbenzylaminophenyl)-1-phenyl-2-butanone, 1-(p-methylbenzylaminophenyl)-1-p-tolyl-2-butanone, 1-(p-methylbenzylaminophenyl)-1-phenyl-2-octanone, 1-(p-dibenzylaminophenyl)-1-phenyl-2-propanone, 1-(p-dibenzylaminophenyl)-1-phenyl-2-butanone, 1-(p-dibenzylaminophenyl)-1-p-tolyl-2-butanone, 1-(p-pyrrolidinophenyl)-1-phenyl-2-propanone, 1-(p-dibenzylaminophenyl)-1-phenyl-2-octanone and the hydrochloride of each of the above compounds.

The following examples are illustrative of the process and products of the present invention, but are not to be construed as limiting.

EXAMPLE 1

*1-(p-dibenzylaminophenyl)-1-phenyl-2-phenoxypropanol*

To 173.3 grams (0.492 mole) of N-(p-bromophenyl)-dibenzylamine suspended in 4160 milliliters of anhydrous ether in a nitrogen swept flask was added 6.94 grams (1 mole) of small pieces of lithium ribbon. The mixture was stirred and refluxed for four hours.

To the resulting stirred solution of p-dibenzylaminophenyl lithium was added 111.1 grams (0.492 mole) of α-phenoxypropiophenone dissolved in one liter of anhydrous ether over a period of thirty minutes after which the mixture was refluxed for two hours and then decomposed with twenty percent aqueous ammonium chloride. The ether layer was separated, washed with water, dried and evaporated to dryness at reduced pressure. The residue crystallized from cyclohexane to give 162.2 grams of 1 - (p-dibenzylaminophenyl) - 1 - phenyl-2-phenoxypropanol melting at 129 to 139 degrees centigrade.

EXAMPLE 2

*1-(p-benzylmethylaminophenyl)-1-phenyl-2-phenoxypropanol*

To 4.5 grams (0.65 mole) of small pieces of lithium ribbon suspended in 200 milliliters of anhydrous ether was added with stirring a solution of 79.7 grams (0.299 mole) of N-(p-bromophenyl)-N-methylbenzylamine in 250 milliliters of anhydrous ether. After addition was complete the mixture was stirred and refluxed for an additional three hours.

To the resulting stirred solution of N-benzylmethylaminophenyl lithium was added a solution of 67.7 grams (0.299 mole) of α-phenoxypropiophenone in 750 milliliters of anhydrous ether and the mixture refluxed thereafter for two hours. The addition product was decomposed with aqueous ammonium chloride whereupon the product crystallized from the mixture. The product was removed by filtration, washed with water and then washed with ether. The combined ether layers were separated, washed with water, dried and the ether then reduced to a small volume at reduced pressure. A second crop of solid precipitated and was combined with the first. There was obtained 83.9 grams of 1-(p-benzylmethylaminophenyl)-1-phenyl-2-phenoxypropanol melting at 130 to 141 degrees centigrade.

EXAMPLE 3

*1-(p-dimethylaminophenyl)-1-phenyl-2-phenoxypropanol*

To an ethereal solution of p-dimethylaminophenyl lithium, prepared as described in Example 2 from twenty grams (0.1 mole) of p-bromodimethylaniline and lithium ribbon, was added a solution of 22.6 grams (0.1 mole) of α-phenoxypropiophenone in 175 milliliters of anhydrous ether. The mixture was refluxed for two hours and then kept overnight at room temperature. To the reaction mixture was added 100 milliliters of a twenty percent aqueous ammonium chloride solution and the solid that had precipitated was removed by filtration. There was obtained 25.0 grams of 1-(p-dimethylaminophenyl)-1-phenyl-2-phenoxypropanol as a grey-green solid melting at 146 to 152 degrees centigrade. Repeated recrystallization from cyclohexane and a decolorization with carbon raised the melting point to 160 to 162 degrees centigrade.

Calculated for $C_{23}H_{25}NO_2$: C, 79.50; H, 7.25; N, 4.03. Found: C, 79.24; H, 7.51; N, 4.03.

The mother liquor from the original filtration was extracted with ether to give more product which, when crystallized from ether, gave another 8.06 grams of a mixture of diasterioisomers melting at 115 to 129 degrees centigrade.

EXAMPLE 4

*1-(p-dimethylaminophenyl)-1-phenyl-2-ethoxypropanol* p-Dimethylaminophenyl lithium in 100 milliliters of anhydrous ether was prepared in the manner described in Example 2 from twenty grams (0.1 mole) of p-bromodimethylaniline and lithium ribbon. To the stirred solution was added dropwise a solution of 17.8 grams (0.1 mole) of α-ethoxypropiophenone in 25 milliliters of dry ether. The mixture was stirred and refluxed for two hours and then maintained at room temperature overnight. To the stirred mixture was then added 100 milliliters of twenty percent ammonium chloride solution and the ether layer separated. The aqueous layer was extracted twice with 100 milliliter portions of ether. The combined ethereal extracts were dried over sodium sulfate and the ether then removed. The ether was distilled and the residue was crystallized from Skellysolve C to give 7.75 grams of yellow needles of 1-(p-dimethylaminophenyl)-1-phenyl-2-ethoxypropanol melting at 88 to 112 degrees centigrade.

EXAMPLE 5

*1-(p-piperidinophenyl)-1-phenyl-2-phenoxypropanol*

Following the procedure of Example 2, 1-(p-piperidino-phenyl)-1-phenyl-2-phenoxypropanol is prepared by adding α-phenoxypropiophenone to the reaction mixture resulting from the reaction of N-(p-bromophenyl)-piperidine with lithium ribbon.

EXAMPLE 6

1-(p-dibenzylaminophenyl)-1-phenyl-2-propanone and hydrochloride

A solution of 162.2 grams of 1-(p-dibenzylaminophenyl)-1-phenyl-2-phenoxypropanol in 570 milliliters of acetone and 250 milliliters of concentrated hydrochloric acid was refluxed for six hours and then the acetone removed by distillation at reduced pressure. The residual mixture of 1-(p-dibenzylaminophenyl)-1-phenyl-2-propanone hydrochloride was diluted with water and basified to a pH 12 with twenty percent aqueous sodium hydroxide. The precipitated product was extracted twice with chloroform and the extracts dried and evaporated to dryness under vacuum. The residue was recrystallized three times from cyclohexane to give 81.2 grams of 1-(p-dibenzylaminophenyl)-1-phenyl-2-propanone melting at 120 to 122 degrees centigrade. One recrystallization from ethyl alcohol followed by one from cyclohexane gave material melting at 120 to 123.5 degrees.

Calculated for $C_{29}H_{27}NO$: C, 85.89; H, 6.71; N, 3.45. Found: C, 86.01; H, 7.02; N, 3.50.

EXAMPLE 7

1-(p-methylbenzylaminophenyl)-1-phenyl-2-propanone and hydrochloride

A solution of 83.9 grams of 1-(p-methylbenzylaminophenyl)-1-phenyl-2-phenoxypropanol in 200 milliliters of concentrated hydrochloric acid and 600 milliliters of acetone was refluxed overnight and the acetone then removed at reduced pressure. The residual aqueous solution of 1-(p-methylbenzylaminophenyl)-1-phenyl-2-propanone hydrochloride was neutralized with sodium bicarbonate and made alkaline with sodium hydroxide. The mixture was extracted twice with ether and the combined ether extracts were washed once with 1 N sodium hydroxide and once with water and then dried over anhydrous sodium carbonate. The ether was separated and concentrated to about 200 milliliters and then chilled to zero degrees centigrade. The precipitated product was separated and dried to give 47.1 grams of 1-(p-methylbenzylaminophenyl)-1-phenyl-2-propanone melting at 75.5 to 77.8 degrees centigrade. Recrystallization once from ethyl alcohol and once from cyclohexane raised the melting point to 75.8 to 78.4 degrees.

Calculated for $C_{23}H_{23}NO$: C, 83.85; H, 7.04; N, 4.25. Found: C, 83.93; H, 7.06; N, 4.42.

EXAMPLE 8

1-(p-dimethylaminophenyl)-1-phenyl-2-propanone

To 14.45 grams (0.0416 mole) of 1-(p-dimethylaminophenyl)-1-phenyl-2-phenoxypropanol was added 83.2 milliliters of water and 32.8 milliliters of concentrated hydrochloric acid. The solution was refluxed for four hours. The reaction was then extracted with ether. The aqueous layer was basified with aqueous sodium carbonate and extracted with ether. The combined ethereal extracts were dried over sodium sulfate and the ether then removed. There was obtained 9.65 grams of 1-(p-dimethylaminophenyl)-1-phenyl-2-propanone as tan crystals melting at 67 to 68 degrees centigrade.

Following the procedure above, 7.64 grams of 1-(p-dimethylaminophenyl)-1-phenyl-2-ethoxypropanol gave 6.4 grams of 1-(p-dimethylaminophenyl)-1-phenyl-2-propanone possessing the same melting point as indicated above.

Calculated for $C_{17}H_{19}NO$: C, 80.57; H, 7.56; N, 5.53. Found: C, 80.89; H, 7.23; N, 5.71.

The hydrochloride prepared in the usual way melted at 152 to 153 degrees centigrade after recrystallization from ethyl acetate.

Calculated for $C_{17}H_{19}NO \cdot HCl$: C, 70.46; H, 6.96; Cl, 12.23. Found: C, 70.54; H, 7.17; Cl, 12.11.

EXAMPLE 9

1-(p-piperidinophenyl)-1-phenyl-2-propanone and hydrochloride

Following the procedure of Example 8, 1-(p-piperidinophenyl)-1-phenyl-2-phenoxypropanol was converted with hydrochloric acid to 1-(p-piperidinophenyl)-1-phenyl-2-propanone hydrochloride which was converted with aqueous sodium hydroxide to 1-(p-piperidinophenyl)-1-phenyl-2-propanone.

EXAMPLE 10

1-(p-aminophenyl)-1-phenyl-2-propanone and hydrochloride

Fifty grams (0.123 mole) of 1-(p-dibenzylaminophenyl)-1-phenyl-2-propanone was hydrogenated in five ten-gram lots, each suspended in 300 milliliters of ethyl alcohol and 5.72 grams of ten percent palladium on charcoal catalysts at an initial pressure of fifty p.s.i. After a reaction time of from one to 1½ hours, during which time the theoretical drop in pressure occurred, the catalyst was removed by filtration, washed with alcohol and the combined filtrates evaporated to dryness at reduced pressure. The residual 1-(p-aminophenyl)-1-phenyl-2-propanone was dissolved in dry ether and the solution acidified with ethereal hydrogen chloride. The brown precipitate was separated by decanting the ether and triturated with boiling methyl ethyl ketone which, after cooling, was separated by filtration. The solid was washed with cold methyl ethyl ketone and then recrystallized from a one to five mixture of ethyl alcohol and ethyl acetate to give 19.45 grams (86.3 percent) of 1-(p-aminophenyl)-1-phenyl-2-propanone hydrochloride melting at 190.5 to 195 degrees centigrade.

Calculated for $C_{15}H_{15}NO \cdot HCl$: C, 68.83; H, 6.16; N, 5.35; Cl, 13.55. Found: C, 68.59; H, 6.19; N, 5.25; Cl, 13.56.

EXAMPLE 11

1-(p-methylaminophenyl)-1-phenyl-2-propanone and hydrochloride

Ten grams (0.0304 mole) of finely ground 1-(p-benzylmethylaminophenyl)-1-phenyl-2-propanone was suspended in 300 milliliters of ethyl alcohol and hydrogenated with 2.0 grams of ten percent palladium on carbon catalyst at an initial pressure of fifty p.s.i. In about twenty minutes the theoretical amount of hydrogen had been taken up and the catalyst was then removed and the solution evaporated to dryness at reduced pressure. The 6.5 grams of 1-(p-methylaminophenyl)-1-phenyl-2-propanone was dissolved in 100 milliliters of anhydrous ether and filtered. To the filtrate was added an ethereal solution of hydrogen chloride. The white precipitate was filtered and washed with ether. Crystallization from a mixture of forty milliliters of ethyl alcohol and 200 milliliters of ethyl acetate gave 6.13 grams (73.4 percent of theory) of 1-(p-methylaminophenyl)-1-phenyl-2-propanone hydrochloride melting at 144.5 to 146.5 degrees centigrade.

Calculated for $C_{16}H_{17}NO \cdot HCl$: C, 69.68; H, 6.58; N, 5.08; Cl, 12.86. Found: C, 69.47; H, 6.65; N, 5.38; Cl, 12.84.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. 1 - (p - aminophenyl) - 1 - aryl - 2 - hydrocarbonoxyalkanols represented by the formula

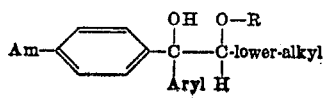

wherein R is a hydrocarbon radical containing from one to eight carbon atoms, inclusive, aryl is a hydrocarbon carbocyclic aryl radical containing from six to twelve carbon atoms, inclusive, and Am is an amino group selected from the group consisting of tertiary di-lower-alkylamino, tertiary dibenzylamino, tertiary lower-alkylbenzylamino and alkyleneamino of the formula

wherein R' is an alkylene group containing from four to eight carbon atoms, inclusive, which with the amino nitrogen atom forms a ring containing from four to five carbon atoms.

2. 1-(p-dibenzylaminophenyl)-1 - phenyl - 2 - hydrocarbonoxyalkanols represented by the formula

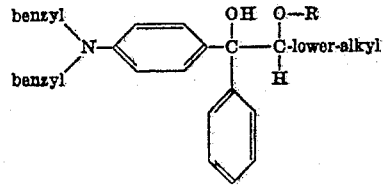

wherein R is a hydrocarbon radical containing from one to eight carbon atoms, inclusive.

3. 1 - (p - dibenzylaminophenyl) - 1 - phenyl - 2 - phenoxypropanol.

4. 1-(p-alkoxybenzylaminophenyl)-1 - phenyl - 2 - hydrocarbonoxyalkanols represented by the formula

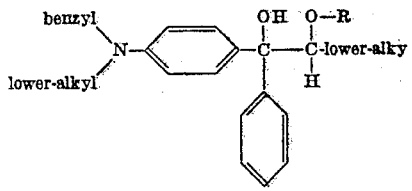

wherein R is a hydrocarbon radical containing from one to eight carbon atoms, inclusive.

5. 1 - (p - methylbenzylaminophenyl) - 1 - phenyl - 2 - phenoxypropanol.

6. 1-(p-dialkylaminophenyl) - 1 - phenyl - 2 - hydrocarbonoxyalkanols represented by the formula

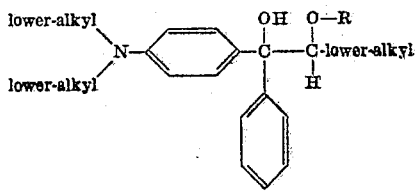

wherein R is a hydrocarbon radical containing from one to eight carbon atoms, inclusive.

7. 1-(p-dimethylaminophenyl) - 1 - phenyl - 2 - ethoxypropanol.

8. 1-(p-dimethylaminophenyl)-1 - phenyl - 2 - phenoxypropanol.

9. A compound selected from the group consisting of 1-(p-aminophenyl)-1-aryl-2-alkanones represented by the formula

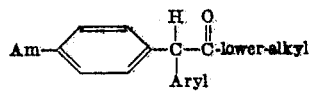

wherein aryl is a hydrocarbon carbocyclic aryl group containing from six to twelve carbon atoms, inclusive, and Am is an amino group selected from the group consisting of primary amino, secondary lower-alkylamino, tertiary di-lower-alkylamino, tertiary lower-alkylbenzylamino, tertiary dibenzylamino and alkyleneamino of the formula

wherein R' is an alkylene group containing from four to eight carbon atoms, inclusive, which with the amino nitrogen atom forms a ring containing from four to five carbon atoms, and acid addition salts thereof.

10. Acid addition salts of 1-(p-aminophenyl)-1-phenyl-2-alkanones represented by the formula

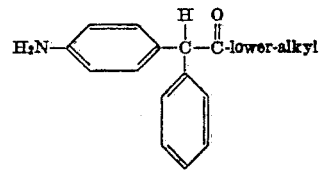

11. 1-(p-aminophenyl)-1 - phenyl - 2 - propanone hydrochloride.

12. Acid addition salts of 1-(p-aminophenyl)-1-phenyl-2-alkanones represented by the formula

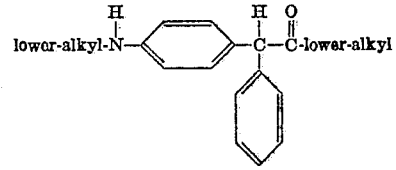

13. 1-p(-methylaminophenyl)-1 - phenyl - 2 - propanone hydrochloride.

14. Acid addition salts of 1-(p-aminophenyl)-1-phenyl-2-alkanones represented by the formula

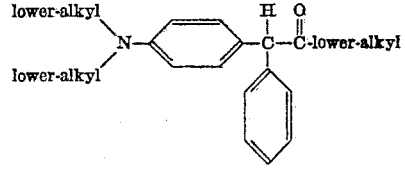

15. 1 - (p - dimethylaminophenyl) - 1 - phenyl - 2 - propanone hydrochloride.

16. 1-(p-aminophenyl)-1-phenyl-2-alkanones represented by the formula

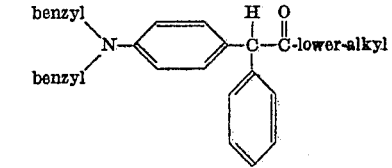

17. 1-(p-dibenzylaminophenyl) - 1 - phenyl - 2 - propanone.

18. 1-(p-aminophenyl)-1 - phenyl - 2 - alkanones represented by the formula

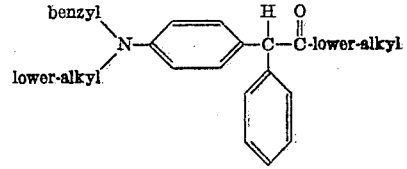

19. 1-(p-methylbenzylaminophenyl)-1-phenyl - 2 - propanone.

No references cited.

UNITED STATES PATENT OFFICE
Certificate of Correction

Patent No. 2,881,216                          April 7, 1959

John B. Wright

It is hereby certified that error appears in the printed specification of the above numbered patent requiring correction and that the said Letters Patent should read as corrected below.

Column 1, lines 34 to 37, Formula III, should appear as shown below instead of as in the patent—

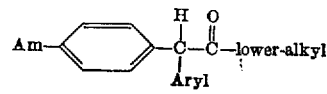

column 8, line 33, for "1-p(-methylaminophenyl)-" read —1-(p-methylaminophenyl)-—.

Signed and sealed this 1st day of September 1959.

[SEAL]

Attest:
KARL H. AXLINE,
*Attesting Officer.*

ROBERT C. WATSON,
*Commissioner of Patents.*